E. W. COMFORT.
THERMOSTATIC VALVE DEVICE.
APPLICATION FILED APR. 9, 1907.
1,004,684.
Patented Oct. 3, 1911.
2 SHEETS—SHEET 1.
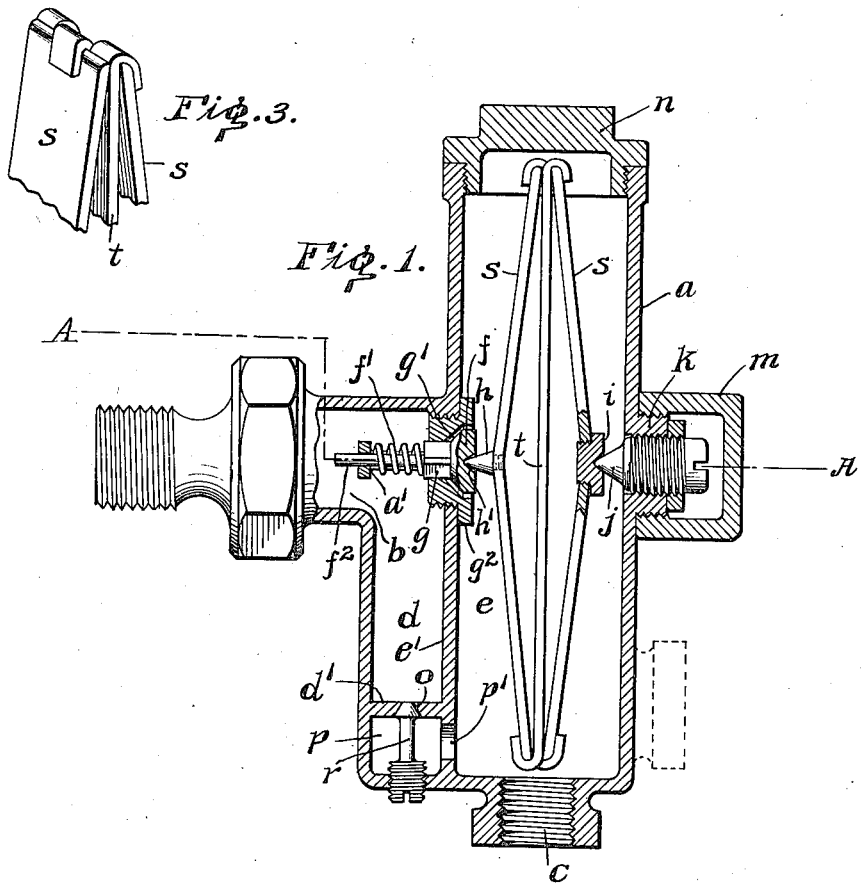
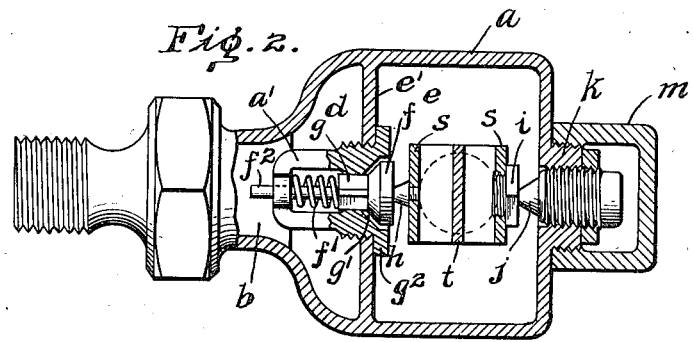
Witnesses
Danl. Webster, Jr.
R. M. Kelly.
Inventor
Edward W. Comfort
By
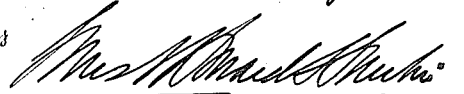
Attorney

E. W. COMFORT.
THERMOSTATIC VALVE DEVICE.
APPLICATION FILED APR. 9, 1907.

1,004,684.

Patented Oct. 3, 1911.
2 SHEETS—SHEET 2.

Witnesses

Inventor
Edward W. Comfort
By
Attorney

UNITED STATES PATENT OFFICE.

EDWARD W. COMFORT, OF CAMDEN, NEW JERSEY, ASSIGNOR TO WARREN WEBSTER & COMPANY, A CORPORATION OF NEW JERSEY.

THERMOSTATIC VALVE DEVICE.

1,004,684.      Specification of Letters Patent.      Patented Oct. 3, 1911.

Application filed April 9, 1907. Serial No. 367,160.

*To all whom it may concern:*

Be it known that I, EDWARD W. COMFORT, of the city and county of Camden and State of New Jersey, have invented an Improvement in Thermostatic Valve Devices, of which the following is a specification.

My invention relates particularly to valve devices to control thermostatically the discharge of air and water of condensation from steam radiators.

Objection has been found to thermostatic valves which employ composition expanding pieces, owing to the liability of the composition deteriorating in quality after much use and the composition pieces becoming bent and thereby rendered inefficient. Difficulty has also been experienced in the use of compound metal thermostats in making the same sufficiently small and sensitive.

It is the object of my invention to provide a valve device having a compound metal thermostat possessing the requisite sensitiveness and of a satisfactory size.

It is also an object of my invention to provide means for separating the dirt or foreign matter that may enter from the radiator and preventing it from passing through the valve passageway and affecting the operation of the valve.

The invention also relates to improvements in construction and combinations of parts, whereby the thermostatic action may be adjusted and the assembling of the parts may be facilitated.

Figure 4:
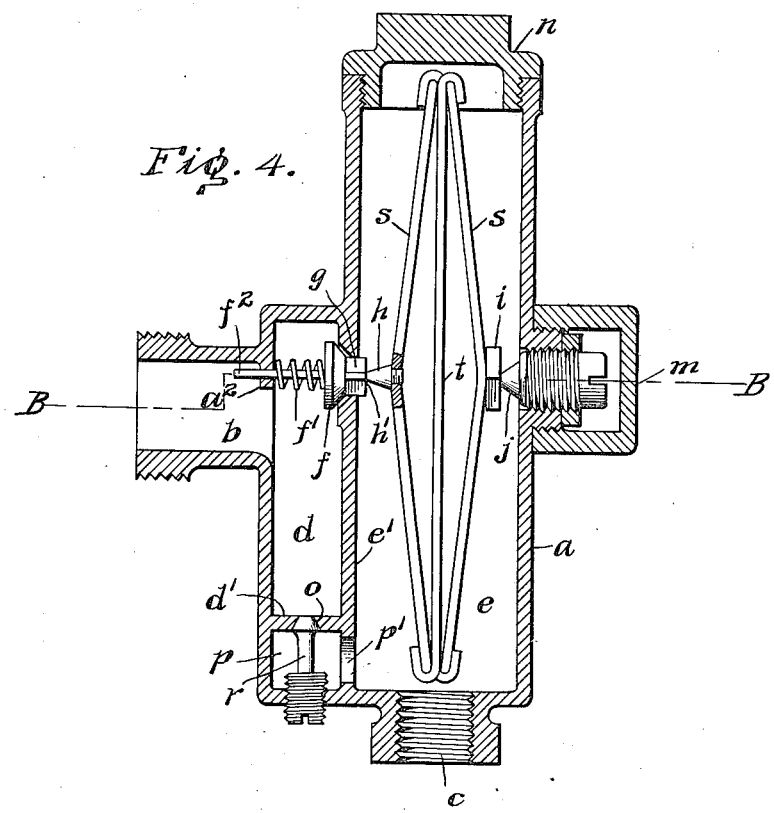

In the drawings: Figure 1 is a vertical sectional view of a thermostatic valve device embodying my invention; Fig. 2 is a horizontal section of the same on the line A—A of Fig. 1; Fig. 3 is a perspective view of one end of the preferred form of the thermostat; Fig. 4 is a vertical view similar to Fig. 1 illustrating a modification; and Fig. 5 is a horizontal section on the line B—B of Fig. 4.

$a$ is the valve-body having an inlet $b$ and an outlet $c$. In the particular construction shown the inlet $b$ opens into a dirt chamber or pocket $d$, from the upper part of which the thoroughfare or inlet passageway $g$ leads into the interior $e$ of the valve-body proper. This thoroughfare or passageway is controlled by a valve $f$ which is in turn controlled by a spring $f'$, and the thermostat in the chamber $e$.

In Figs. 1 and 2 I have shown a conical valve $f$ fitting a conical seat $g'$ on a seat piece $g^2$ screwed into the dividing wall $e'$, with a stem $f^2$ extending through a guide $a'$ on the seat piece and the spring $f'$ between the guide $a'$ and valve acting to force it open.

Figure 5:
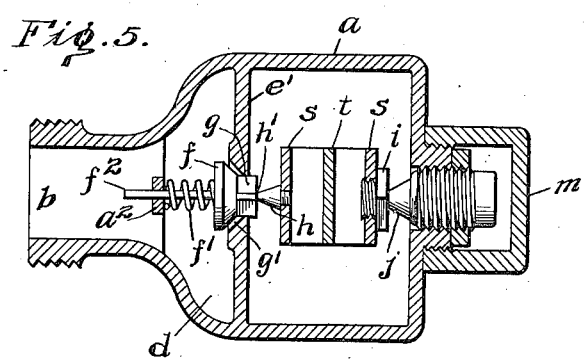

In Figs. 4 and 5, the valve $f$ fits a seat in the wall $e'$ and the spring $f'$ acts to close it on its seat. In this case the stem $f^2$ is guided in a guide lug $a^2$ in the valve casting. The thermostat is located in the chamber $e$ and is formed of bars connected at their ends and composed of metal having different coefficients of expansion.

In the preferred form the thermostat is composed of three bars or metal strips securely fastened together at their ends, with the two outer bars $s\ s$ somewhat longer than the middle bar $t$. This causes the outer bars to assume a bent form as shown. When the thermostat is employed as in Figs. 1 and 2, to close the valve against the action of the spring $f'$, the outer members $s$ are of the metal having the higher coefficient of expansion, and when the thermostat is employed as in Figs. 4 and 5 to open the valve against the spring action, the member $t$ is the one having the higher coefficient. I do not mean to limit my invention to the use of any particular metals. Satisfactory results have been obtained with zinc and iron, but I prefer to use phosphor-bronze as the metal of greater expansibility and an iron-nickel alloy known as "invar" as the other metal. This thermostat is provided on one of its bars with a pin $h$ which fits a socket $h'$ in the head of the valve $f$, and on the other bar with a socket $i$ which receives a supporting pin $j$ carried by the valve-body. The thermostat is arranged as shown, supported on one side by the pin $h$ and socket $h'$ and on the other by the pin $j$ and socket $i$. The thermostat may be adjusted by the pin $j$, which preferably extends through a threaded boss $k$ in the body, so that it may be adjusted from the outside; a cap $m$ may be screwed on the boss $k$ to inclose the pinhead. The valve-body has an opening at the top through which the thermostat may be inserted and put into place. The pin $j$ is made large to provide a sufficiently large aperture through which the valve-seat may be machine-finished and the valve $f$ fitted.

$n$ is the cap closing the open top of the valve-body. In the lower part of the dirt chamber $d$ is a wall $d'$ forming a pocket $p$ having an opening $p'$ into the interior $e$ of the valve-body. An aperture $o$ in the wall $d$ is controlled by a plug $r$ screwed into the body. When the plug $r$ is unscrewed to open the aperture $o$, the dirt or sediment in the chamber $d$ may be discharged through the opening $p'$ into the lower part of the chamber $e$ and hence to the return. The chamber $d$ forms a well below the main inlet $b$, which becomes filled with water and forms a catch basin for the collection of the particles of heavy matter, which are thus prevented from passing through the valve passageway $g$.

The thermostat $s$, $s$, $t$ is adjusted so that the valve $f$ will be slightly open to permit the escape of air and water of condensation into the chamber $e$ and thence through the outlet $c$ into the return; and the extent of this opening may be adjusted by the pin $j$ to suit the requirements of the particular unit of radiation to which the valve is attached. When steam passes through the opening $g$ into the chamber $e$ the higher temperature acting on the thermostat will cause the metal having the greater coefficient of expansion to expand, and the valve $f$ will be closed upon its seat against the action of the spring $f'$. As soon as the thermostat cools and contracts, the spring $f'$ will again open the valve $f$ to the normal extent permitted by the adjustment of the pin $j$.

What I claim is as follows:

1. In a thermostatic valve, the combination of a body having a main chamber provided with the outlet, and a preliminary chamber provided with the inlet and forming a pocket extending below the inlet for the interception of dirt, a wall between said chambers, the wall between the main chamber and preliminary chamber being provided with the thoroughfare between the inlet and outlet located adjacent to the inlet, a valve-piece controlling said thoroughfare, a thermostat extending longitudinally in the main chamber and having its central portion on one side acting on and supported by said valve-piece, and a supporting pin at substantially the middle of the outer side of the wall of the main chamber acting upon and supporting the thermostat at its central portion on its other side.

2. In a thermostatic valve, the combination of a body having a main chamber open at the top and provided with the outlet at its bottom and a preliminary chamber provided with the inlet and forming a pocket extending below the inlet for the interception of dirt, a wall between said chambers, the wall between the main chamber and preliminary chamber being provided with the thoroughfare between the inlet and outlet located adjacent to the inlet, a valve-piece controlling said thoroughfare, a thermostat extending longitudinally in the main chamber and having its central portion at one side supported by and acting on the valve-piece and at the other side supported by the opposite wall of the main chamber, and a removable cap closing the open top of said main chamber.

3. In a thermostatic valve, the combination of a body having a main chamber provided with the outlet at the bottom and a preliminary chamber provided with the inlet and forming a pocket extending below the inlet for the interception of dirt, a wall between said chambers, the wall between the main chamber and preliminary chamber being provided with the thoroughfare between the inlet and outlet, and the main and preliminary chambers also having communication at the bottom, a valve-piece to control the thoroughfare, a thermostat in the main chamber controlling said valve-piece, and a manually adjustable valve controlling the communication between the bottom of the preliminary chamber and the main chamber.

4. In a thermostatic valve, the combination of a body having a main chamber provided with an outlet at the bottom, and a preliminary chamber provided with the inlet and extending below the inlet and adjacent to the lower portion of the main chamber, a wall between said chambers, provided with an opening between the bottom of the preliminary chamber and the lower portion of the main chamber and also with a thoroughfare between the upper part of the preliminary chamber and the main chamber, a manually adjustable valve, controlling the communication between the bottom of the preliminary chamber and the lower portion of the main chamber, and an automatically controlled valve controlling the thoroughfare between upper part of the preliminary chamber and the main chamber.

5. In a thermostatic valve, the combination of a body having a main chamber, provided with an outlet at the bottom, and a preliminary chamber provided with the inlet, and extending below the inlet and adjacent to the lower portion of the main chamber, a wall between said chambers, provided with an opening between the bottom of the preliminary chamber and the lower portion of the main chamber and also with a thoroughfare between the upper part of the preliminary chamber and the main chamber, a manually adjustable valve, controlling the communication between the bottom of the preliminary chamber and the lower portion of the main chamber, an automatically controlled valve controlling the thoroughfare between upper part of the preliminary chamber and the main chamber, and a thermostat in the main chamber controlling said automatically controlled valve.

6. In a thermostatic valve, the combination of a body having a main chamber open at the top and provided with an outlet at the bottom, and a preliminary chamber provided with the inlet and extending below the inlet and adjacent to the lower portion of the main chamber, a wall between said chambers, provided with an opening forming a communication between the bottom of the preliminary chamber and the lower portion of the main chamber, and also with a thoroughfare between the upper part of the preliminary chamber and the main chamber, a valve to control the communication between the bottom of the preliminary chamber, and the lower part of the main chamber, an automatic valve to control the thoroughfare between the upper part of the preliminary chamber and the main chamber, a thermostat in the main chamber, controlling said automatic valve, and a removable cap closing the open top of the main chamber.

In testimony of which invention, I have hereunto set my hand.

EDWARD W. COMFORT.

Witnesses:
 HENRY A. STRATTON,
 F. JOSEPH MILLER.